United States Patent [19]

Katona

[11] 4,194,334
[45] Mar. 25, 1980

[54] SELF-SEALING SOLAR COLLECTOR SHIELD

[75] Inventor: Joseph W. Katona, Walled Lake, Mich.

[73] Assignee: Mills Products, Inc., Farmington, Mich.

[21] Appl. No.: 912,755

[22] Filed: Jun. 5, 1978

[51] Int. Cl.² .............................................. E04B 1/62
[52] U.S. Cl. ...................................... 52/397; 52/395; 52/399; 52/458; 52/476; 52/788; 52/825
[58] Field of Search ................. 52/202, 203, 397, 399, 52/395, 403, 476, 658, 788, 790, 825, 456, 458; 49/61

[56] References Cited

U.S. PATENT DOCUMENTS

| | | | |
|---|---|---|---|
| 2,136,273 | 11/1938 | Chaffee et al. | 52/790 X |
| 2,228,363 | 1/1941 | Penney | 52/580 |
| 2,266,235 | 12/1941 | Mollard | 52/202 |
| 2,282,831 | 5/1942 | Shutts | 156/109 X |
| 2,286,890 | 6/1942 | Birt | 52/399 X |
| 2,354,341 | 7/1944 | Verhagen | 52/399 |
| 2,572,764 | 10/1951 | Rogers et al. | 52/202 |
| 2,576,348 | 11/1951 | Kinghorn | 52/202 |
| 2,740,173 | 4/1956 | Webster | 52/775 X |
| 2,777,548 | 1/1957 | Adams | 52/202 X |
| 2,787,347 | 4/1957 | Henderson et al. | 52/213 |
| 3,383,801 | 5/1968 | Dallaire | 49/458 |
| 3,418,779 | 12/1968 | Jendrisak et al. | 52/788 |
| 3,421,259 | 1/1969 | Egan, Jr. | 52/203 |
| 3,596,980 | 8/1971 | Cadiou | 296/154 |
| 3,698,148 | 10/1972 | Marantier | 52/400 |
| 4,008,552 | 2/1977 | Biebuyck | 52/403 X |
| 4,043,091 | 8/1977 | Katona | 52/788 |

Primary Examiner—Alfred C. Perham
Attorney, Agent, or Firm—Whittemore, Hulbert & Belknap

[57] ABSTRACT

Window structure for a solar collector shield or the like having a frame defining a row of separate window openings. A self-contained window unit is installed in each opening. Each window unit comprises a pair of rectangular glass panes held in laterally spaced parallel relation by a peripheral window frame. A mounting frame is provided for mounting each window unit in its window opening. Each mounting frame has overlapping frame members. Adjacent side frame members of adjacent window units also overlap. The overlap is for the purpose of excluding moisture and preventing heat loss. A peripheral window seal is provided for the same purpose.

12 Claims, 7 Drawing Figures

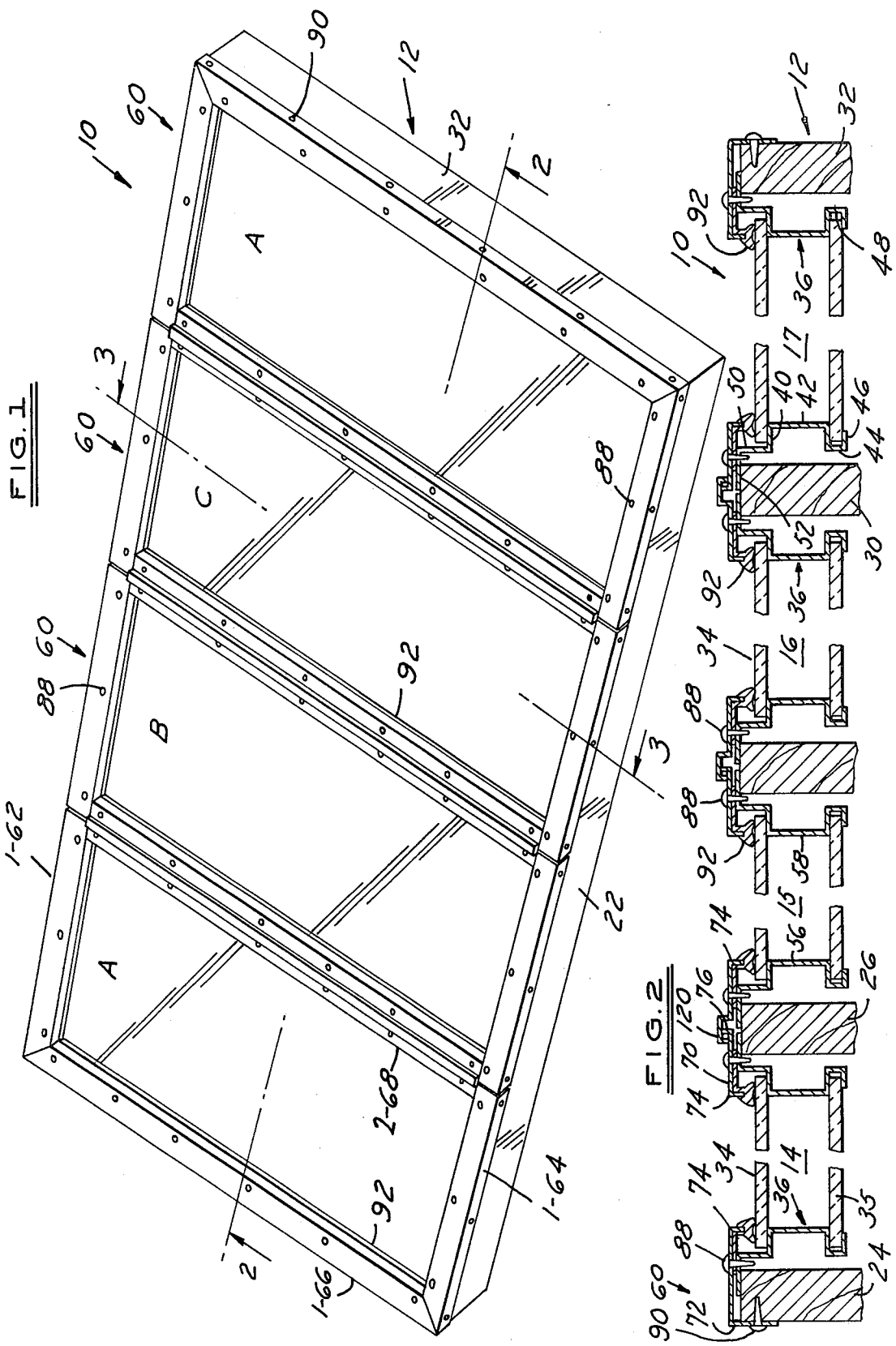

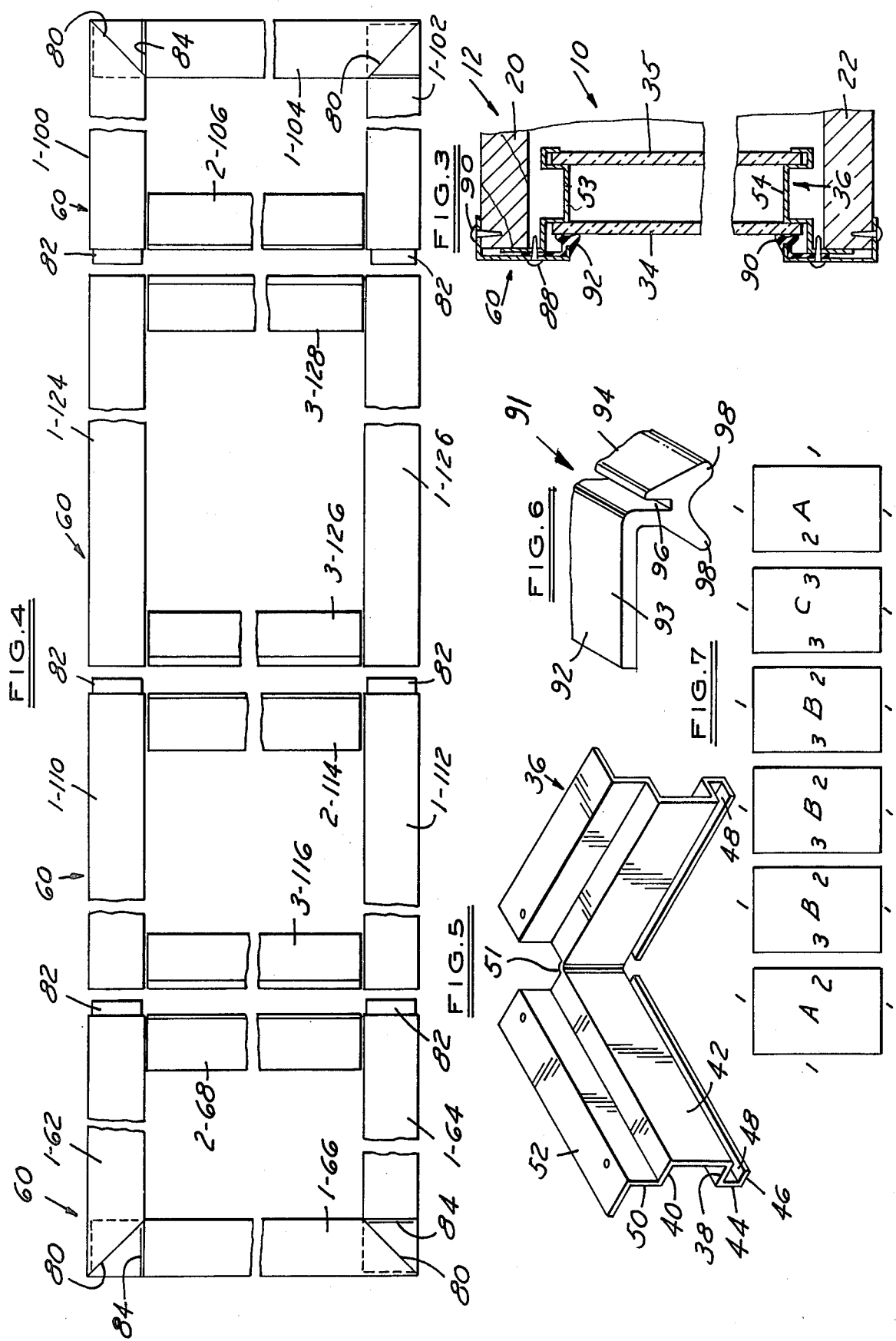

SELF-SEALING SOLAR COLLECTOR SHIELD

SUMMARY OF THE INVENTION

The self-contained window units of this invention are designed to insulate against external heat loss and to exclude moisture. Such windows can be used alone or in combination with other units, as desired.

Each window unit has a mounting frame, the individual elements of which are constructed and arranged to cooperate with one another in the elimination or exclusion of moisture. To this end, some of the elements of the mounting frame overlap in end to end relation. In instances where a plurality of such units are installed in a row of window openings, the mounting frame members of adjacent units are formed to overlap or interengage likewise for the purpose of excluding moisture. At the same time that moisture is prevented from entering, heat is prevented from escaping.

A seal of rubber or the like is also provided, designed to provide a double seal and the effectiveness of which is actually increased by distortion caused by the weight of the window panes.

The self-contained window units are designed to facilitate the installation of a plurality of such units in openings arranged in side by side relation so that the desired overlap may be effected as each unit is installed in sequence. More specifically, assuming a row of window openings each to be fitted with a window unit, two end units are first installed, then the appropriate number of so-called extender units are installed beginning in sequence from one end unit so that each succeeding window unit overlaps the preceding one up to but not including the window opening next adjacent to the opposite end window unit. Then a so-called cap unit is installed in the last remaining opening to complete the assembly of the windows in a composite window structure which effectively seals in heat and seals out moisture.

These and other objects of the invention will become more apparent as the following description proceeds, especially when considered with the accompanying drawings, wherein:

FIG. 1 is a perspective view of a solar collector shield having a row of openings in which self-contained window units are installed, all in accordance with my invention;

FIG. 2 is a sectional view taken on the line 2—2 in FIG. 1;

FIG. 3 is a sectional view taken on the line 3—3 in FIG. 1;

FIG. 4 is a partially exploded fragmentary view with parts broken away and in section showing the frame members of the mounting frames of the window units and the manner in which they interengage with one another to seal in heat and seal out moisture;

FIG. 5 is a fragmentary detail showing the corner of the window frame of one of the self-contained window units;

FIG. 6 is a fragmentary detail of a seal; and

FIG. 7 is a diagrammatic view of a plurality of window units arranged side by side for installation in a row of openings such as might be provided in a solar collector shield.

Referring now more particularly to the drawings, the solar collector shield 10 has a border frame 12 defining a row of rectangular window openings 14, 15, 16 and 17. A self-contained window unit is installed in each opening. These window units are designated A, B and C. The solar collector shield is shown in FIG. 1 in a conventional position for use in which it faces generally upwardly although propped up at an acute angle to the horizontal. It will be understood that while the invention is shown embodied in a solar collector shield, it may be used in other installations as well, such for example as a carport roof. The border frame 12 of the solar collector shield comprises a pair of spaced, parallel, longitudinal frame bars 20 and 22 and a plurality of longitudinally spaced parallel side frame bars 24, 26, 28, 30 and 32 extending between the longitudinal frame bars to define the window openings 14–17. Four openings are shown although it will be understood that one or any number of such openings may be provided, as desired.

Each window unit comprises a pair of rectangular transparent glass panes 34 and 35 secured together and retained in spaced parallel relation by a substantially continuous rectangular frame 36. These glass panes are somewhat smaller in length and width than the window openings and may, for example, be formed of tempered glass.

The window frame 36 of each window unit is roll-formed to the configuration shown from a piece of flat stock, preferably metal. The frame 36 may be formed from one continuous piece of flat stock of sufficient length to extend about the entire periphery of the glass panes or it may be formed of two or more shorter pieces whose combined length is the same as the single piece.

The frame 36 has a central portion of channel-shaped configuration having the spaced parallel side walls 38 and 40 extending outwardly from the opposite edges of the web 42. The side wall 38 is bent downwardly to provide the wall 44 which is parallel to web 42. A wall or flange 46 extends inwardly from the wall 44 in spaced parallel relation to the side wall 38. Walls 38, 44 and 46 provide a channel 48 which receives the peripheral edge portions of the lower glass pane. The side wall 40 is bent upwardly parallel to the web 42 to provide wall 50 which terminates in an outwardly extending flange 52 by means of which the frame is secured to a mounting frame more fully described hereinafter. The side wall 40 together with wall 50 forms a recess for supporting and locating the peripheral edge portions of the upper glass pane of the window unit.

The continuous piece, or pieces, of stock from which the window frame is made is prenotched in the flat, that is, before it is roll-formed, at points corresponding to the corners of the rectangular window frame so that it may be hand bent to such rectangular configuration. FIG. 5 shows one of the integral, hand bent corners at 51. The notches extend inwardly from both side edges up to but not including the web 42. The web 42 does not have to be notched to permit bending. The resultant rectangular frame 36 of each window unit consists of the longitudinal or top and bottom window frame members 53 and 54 and the side frame members 56 and 58.

Each window unit is mounted in a window opening by means of a rectangular mounting frame 60. The mounting frame for each window unit has longitudinal top, bottom and side frame members generally coextensive with the corresponding frame members of the window frame. The mounting frame members are of three different cross sectional configurations and for convenience such mounting frame members identified hereinafter will have reference characters prefixed by the numerals 1,2 and 3 depending upon their particular configuration.

Referring to the left hand window unit A in FIG. 1, the mounting frame 60 has the longitudinal top and bottom frame members 1-62 and 1-64, and the side frame members 1-66 and 2-68. The configuration of the side mounting frame member 1-66 is shown in FIG. 2 and will be seen to be generally channel-shaped, having a flat, generally horizontal base 70, a laterally outer down-turned flange 72 and a laterally inner down-turned flange 74. The top and bottom mounting frame members 1-62 and 1-64 have this same configuration. The side frame member 2-68 has the generally Z-shaped configuration shown in FIG. 2, being provided with a flat, generally horizontal base 70, a laterally outer up-turned flange 76 and a laterally inner down-turned flange 74. The bases 70 of the four frame members are co-planer.

One end of the top mounting frame members 1-62 is mitre-cut at about a 45° angle where indicated at 80 and the other end has a pilot extension 82 formed by insetting the base 70 and the flanges 72 and 74. See FIG. 4. The pilot extension 82 is adapted to fit into the channel section of the top frame member of the next window unit in the row, as will be described more fully hereinafter.

The mitred end 80 of the top frame member 1-62 overlaps the square cut end of the side mounting frame member 1-66. It will be noted that this square cut end is inset downwardly slightly at 84 to underlap the mitred end 80 of the top frame member.

The bottom mounting frame member 1-64 has a pilot extension 82 on one end, similar to the pilot extension of the top mounting frame member 1-62. Its opposite square cut end is inset downwardly at 84, similarly to the upper end of the side mounting frame member 1-66, to underlap the mitred end 80 of side frame member 1-66.

The side frame member 2-68 is shorter than the side frame member 1-66 and does not overlap but merely abuts the top and bottom mounting frame members.

The flanges 52 of the window frame members underlie the bases 70 of the mounting frame members and are secured thereto by screws 88. These flanges 52 also rest upon the top surfaces of the frame bars 20,22,24,26 of the collector shield frame 12 when the window unit is installed. The outer down-turned flanges 72 of the mounting frame bars 1-62, 1-64 and 1-66 are secured by screws 90 to the frame bars 20,22 and 24 of the collector shield frame 12.

A peripheral seal 91, which may be a silicon-type rubber or an ethylene propylene terpolymer, for example, seals against the upper surface of the upper glass plane 34 completely around the marginal edge portions thereof. This seal 91 is composed of the elongated top, bottom and side sealing members 92 which contact one another at their ends to form a continuous rectangular seal against the upper surface of the glass pane 34. Each sealing member 92 has the configuration shown in FIG. 6, including a flat strip portion 93 and a down-turned head 94 provided with a slot 96. The head 94 extends downwardly in the form generally of an inverted V, terminating in a pair of elongated laterally spaced ridges 98. These ridges 98 press and spread and seal against the glass throughout the length of the sealing member and hold the glass assembled in the window frame.

Each sealing member 92 is secured to a mounting frame member. As seen in FIGS. 2 and 3, the strip portion 93 extends in surface to surface contact with the underside of the base 70 of the mounting frame member. The down-turned flange 74 of the mounting frame member extends into the slot 96 of the sealing member and presses the sealing member down against the face of the glass. The strip 93 of the sealing member is clamped between the base 70 of the mounting frame member and the flange 52 of the window frame, and the mounting screws 88 pass through the strip. These screws 88 form sealed holes in the strip 93 when they are installed and actually may be self-drilling screws so as to form their own holes in the mounting and window frame members.

The window unit A, complete with the mounting frame members and sealing members, may be installed in the left hand window opening 14 by simply laying it into assembled position, as shown, and applying the screws 90 to complete the installation. The mounting frame members and the sealing members effectively exclude the entrance of moisture and prevent the escape of heat.

The right hand window unit, also designated A, is substantially the same as the left hand window unit, and may be considered a mirror image thereof. The two window units differ only slightly in the construction of certain of the mounting frame members. The top mounting frame member 1-100 is like the top mounting frame member 1-62 of the left hand unit except that the pilot extension 82 and the mitred end 84 are reversed end for end. A similar comparison may be made between the bottom mounting frame member 1-102 and the bottom mounting frame member 1-64 of the left hand unit, that is, its mitred end 80 and pilot extension 82 are reversed end for end. The side frame member 1-104 of the right hand unit is a mirror image of the side mounting frame member 1-66 of the left hand unit. The same comparison can be made of the side mounting frame member 2-106 of the right hand unit with the side mounting frame member 2-68 of the left hand unit. The mitred ends of mounting frame members 1-100 and 1-104 overlap the adjacent ends of members 1-104 and 1-102 as shown. The right hand window unit A is installed in the same manner as the left hand unit.

The window unit B, sometimes referred to as an extender unit is substantially the same as the window units A except for some slight variation in the construction of the mounting frame members. Thus, the top mounting frame member 1-110 is the same as the top mounting frame member 1-62 except that it is square cut rather than mitred on one end. The lower mounting frame member 1-112 is like the lower mounting frame member 1-64 except that its square cut end does not have an insert portion. The side mounting frame member 2-114 is the same as the mounting frame member 2-68. The side mounting frame 3-116 is of a different cross sectional configuration than any thus far described, having the flat or substantially horizontal base 70, the down-turned inner flange 74, and a downwardly opening channel configuration 120 along its outer edge. This side frame member 3-116 is the same length as the side frame member 2-114 so as to have an abutting relation with the top and bottom side frame members. There is no overlap of the mounting frame members in the window unit B.

The extender unit B is installed in opening 15 by securing flanges 72 of the top and bottom mounting frame members 1-110 and 1-112 to frame bars 20 and 22 with screws 90. When installed, the ends of the top and bottom mounting frame members 1-110 and 1-112 of unit B overlap the pilot extensions 82 of the top and bottom frame members of unit A and the channel 120 on the side frame member 3-116 of unit B overlaps the flange 76 on side frame member 2-68 of unit A.

The window unit C, sometimes referred to as a cap unit, differs from the window units previously described in the configuration of certain mounting frame members, but is otherwise the same. Thus, window unit C has top and bottom mounting frame members 1-124 and 1-126 having the same cross sectional configuration as the top and bottom mounting frame members of window unit A, but are square cut on the ends. The side mounting frame members 3-126 and 3-128 are the same as the side mounting frame members 3-116 in window unit B. There is no overlap at the ends of the rectangular mounting frame members in the window unit C.

The cap unit C is installed in opening 16 by securing flanges 72 of the top and bottom mounting frame members to the frame bars 20 and 22 with screws 90. When installed, the ends of the top and bottom mounting frame members of unit C overlap the pilot extensions 82 of the units A and B and the channels 120 of the side frame members of unit C overlap the flanges 76 of the side frame members of units A and B.

FIG. 7 is a diagrammatic view showing a row of six window openings. Any number of openings may be provided. The end window units A are first installed. The extender units are then installed one after another starting from one end, and the cap unit C is the last to be installed. The overlap of the units seals in heat and excludes moisture. The end to end overlap of certain mounting frame bars is designed to best meet the requirements of a structure in which the frame bar 20 is elevated relative to frame bar 22. Because of the overlapped construction, there should be very little need for caulking. Caulking may, for example, be provided at the ends of the non-overlapping side mounting frame bars. The numbers 1,2 and 3 are the prefixes in the identification of the mounting frame members to indicate the cross sectional configuration thereof. Such prefix numbers are used alone as a simplified indication of the frame members in the structure shown in FIG. 7.

If there were only a single window opening, a window unit like the left hand unit A could be employed, differing only in that mounting frame members 1-62 and 1-64 would be mitre-cut on both ends, and side mounting frame member 2-68 would be replaced by member 1-104 of the right hand unit A. If there were only two window openings, a window unit like the left hand unit A could be first installed in the left hand opening, and in the right hand opening a unit could thereafter be installed like cap unit C but differing in that the top and bottom mounting frame members would be mitre-cut on the right end and the right hand side frame member would be replaced by the side frame member 1-104 of the right hand unit A.

The sealing members 92 are bifunctional by virtue of their double ridge construction. The flanges 74 of the mounting frame members press the sealing members down against the surface of the glass, causing the ridges to spread and increase the pressure of sealing contact. A continuous double seal is achieved even in instances in which the glass is warped or out of plane as much as $\frac{1}{8}$". The weight of the glass causes a slight deflection of the window frame which serves to increase the pressure of the seal against the glass (see FIG. 2).

The vertical flanges 72 around the outer periphery of the structure provide a waterproof assembly without caulking or sealing. The mitred joints of each unit are overlapped, each unit overlaps another and the cap unit is the last to be installed and overlaps units on both sides, likewise to waterproof the assembly.

What I claim as my invention is:

1. A self-contained window unit adapted to be assembled in a solar collector shield or the like having means defining a window opening, said window unit comprising a glass pane, retaining means for said pane comprising a window frame extending along the peripheral edge portions of said pane, a mounting frame secured to said window frame for mounting said window unit in said window opening, and a peripheral seal carried by said mounting frame, said peripheral seal having a first portion in sealing contact with said glass pane and a second portion in sealing contact with said window frame.

2. A self-contained window unit as defined in claim 1, wherein said window frame has a flange portion projecting away from said glass pane with which said peripheral seal is in sealing contact as aforesaid.

3. A self-contained window unit as defined in claim 1, wherein said mounting frame and said window frame having flange portions, and means for clamping said second portion of said peripheral seal between said flange portions in sealing contact therewith.

4. A self-contained window unit as defined in claim 3, wherein said mounting frame includes frame members overlapping one another end to end to exclude moisture.

5. A self-contained window unit as defined in claim 3, wherein said first portion of said seal is generally V-shaped in cross section having laterally spaced ridges pressing against said pane.

6. A self-contained window unit adapted to be assembled in a solar collector shield or the like having means defining a window opening, said window unit comprising a glass pane, retaining means for said pane comprising a window frame extending along the peripheral edge portions of said pane, a mounting frame for said window unit, said mounting frame having a portion extending laterally outwardly beyond said glass pane for mounting said window unit in said window opening and to which said window frame is secured, said mounting frame having a portion extending laterally inwardlly of the peripheral edge of said glass pane, and a peripheral seal carried by said laterally inwardly extending portion of said mounting frame having a portion in sealing contact with said glass pane.

7. A self-contained window unit as defined in claim 6, wherein said window frame has a portion extending laterally outwardly beyond said glass pane, and said peripheral seal has a second portion clamped between said laterally outwardly extending portions of said mounting and window frames in sealing contact therewith.

8. A self-contained window unit as defined in claim 7, wherein said window frame has frame members along the top, bottom, and side peripheral edge portions of said glass pane, and said mounting frame has frame members generally co-extensive with said window frame members, certain of the frame members of each frame overlapping one another in end to end relation to exclude moisture.

9. Window structure for a solar collector shield or the like, comprising spaced longitudinal frame bars and a plurality of longitudinally spaced side frame bars extending between said longitudinal frame bars to define a row of separate window openings, a self-contained window unit in each opening, each window unit comprising a glass pane, retaining means for each glass pane comprising a window frame having longitudinal and side frame members extending along the peripheral edge portions thereof, a mounting frame for mounting each window unit in its window opening, each mounting frame having longitudinal and side frame members generally co-extensive with and secured to said longitudinal and side window frame members, and means for securing said mounting frame members to said frame bars, to adjacent side mounting frame members of adjacent window units overlapping one another to exclude moisture, said adjacent side mounting frame members of the two window units in the endmost window openings having upturned flange portions, the remaining window units except one having an upturned flange portion on one side mounting frame member and a downturned flange portion on the other, said one window unit having downturned flange portions on both its side mounting frame members.

10. Window structure for a solar collector shield or the like, comprising spaced longitudinal frame bars and a plurality of longitudinally spaced side frame bars extending between said longitudinal frame bars to define a row of separate window openings, a self-contained window unit in each opening, each window unit comprising a glass pane, retaining means for each glass pane comprising a window frame having longitudinal and side frame members extending along the peripheral edge portions thereof, a mounting frame for mounting each window unit in its window opening, each mounting frame having longitudinal and side frame members generally co-extensive with and secured to said longitudinal and side window frame members, and means for securing said mounting frame members to said frame bars, the adjacent side mounting frame members of adjacent window units overlapping one another to exclude moisture, said adjacent side mounting frame members of the two window units in the endmost window openings having underlying flange portions, the remaining window units except one having an underlying flange portion on one side mounting frame member and overlying flange portion on the other, said one window unit having overlying flange portions on both its side mounting frame members.

11. Window structure as defined in claim 10, wherein said one window unit is in a window opening next adjacent one of the end most window openings.

12. Window structure for a solar collector shield or the like, comprising spaced longitudinal frame bars and a plurality of longitudinally spaced side frame bars extending between said longitudinal frame bars to define a row of separate window openings, a self-contained window unit in each opening, each window unit comprising a glass pane, retaining means for each glass pane comprising a window frame having longitudinal and side frame members extending along the peripheral edge portions thereof, a mounting frame for mounting each window unit in its window opening, each mounting frame having longitudinal and side frame members generally co-extensive with and secured to said longitudinal and side window frame members, and means for securing said mounting frame members to said frame bars, the adjacent side mounting frame members of adjacent window units overlapping one another to exclude moisture, said adjacent side frame members of the two window units in the endmost window openings having underlying portions, and an intermediate window unit having overlying flange portions on both of its side mounting frame members.

* * * * *